United States Patent [19]

Murakami et al.

[11] Patent Number: 5,402,258

[45] Date of Patent: Mar. 28, 1995

[54] OPTICAL SCANNING DEVICE FOR SCANNING LASER BEAM FOCUSED ON IMAGE-FORMING SURFACE

[75] Inventors: Kazunori Murakami, Shizuoka; Tomonori Ikumi; Yasuo Matsumoto, both of Numazu, all of Japan

[73] Assignee: Tokyo Electric Co., Ltd., Tokyo, Japan

[21] Appl. No.: 48,741

[22] Filed: Apr. 16, 1993

[30] Foreign Application Priority Data

Apr. 17, 1992 [JP] Japan ................................. 4-098318
Jul. 17, 1992 [JP] Japan ................................. 4-190768
Dec. 8, 1992 [JP] Japan ................................. 4-328108

[51] Int. Cl.$^6$ ............................................. G02B 26/10
[52] U.S. Cl. ..................................... 359/205; 359/200; 359/220; 347/258
[58] Field of Search ......................... 359/198-200, 359/205-206, 212-221, 223, 226, 819, 207, 642, 718; 250/234-236; 358/474; 348/203; 384/91, 18; 464/170; 346/108; 310/90, 103

[56] References Cited

U.S. PATENT DOCUMENTS

| | | |
|---|---|---|
| 4,367,912 | 1/1983 | Kitamura . |
| 4,877,955 | 10/1989 | Ono . |
| 4,943,128 | 7/1990 | Takada et al. . |
| 4,971,410 | 11/1990 | Wike, Jr. et al. ............... 359/211 |
| 5,184,245 | 2/1993 | Murakami et al. ............... 359/196 |

FOREIGN PATENT DOCUMENTS

0448123A1  9/1991  European Pat. Off. .
0450901A3 10/1991  European Pat. Off. .

OTHER PUBLICATIONS

Patent Abstracts of Japan, vol. 7, No. 127 (P-201) (1272), Jun. 3, 1983 & JP-A-58 046 317 (Canon), Mar. 17, 1983, Laser Scanning Optical System, Abstract only.

*Primary Examiner*—Loha Ben
*Assistant Examiner*—James Phan
*Attorney, Agent, or Firm*—Frishauf, Holtz, Goodman & Woodward

[57] ABSTRACT

A laser beam emitted from the beam emitting unit is deflected for scanning by a reflector rotated by a scanner motor. The deflection scanning beam passes through a meniscus lens device provided close to the reflector, and converges the laser beam on an image-forming surface. The meniscus lens device has an incident surface, a radius of curvature of which is set smaller than that of an output surface thereof, with a convex surface thereof facing the image-forming surface. The laser beam emitting unit, the reflector, the scanner motor, and the meniscus lens device are all integrally built in a housing.

7 Claims, 7 Drawing Sheets

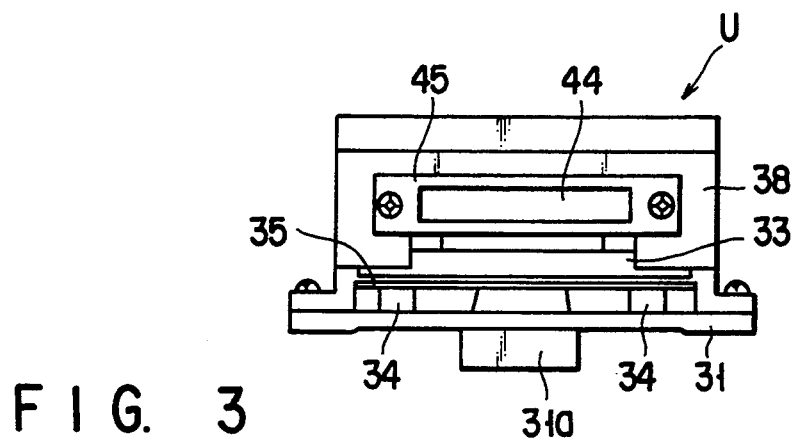
F I G. 3
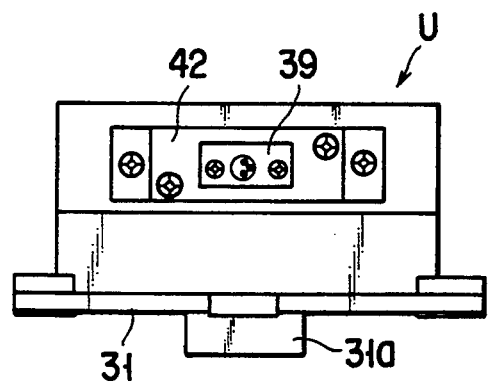
F I G. 4
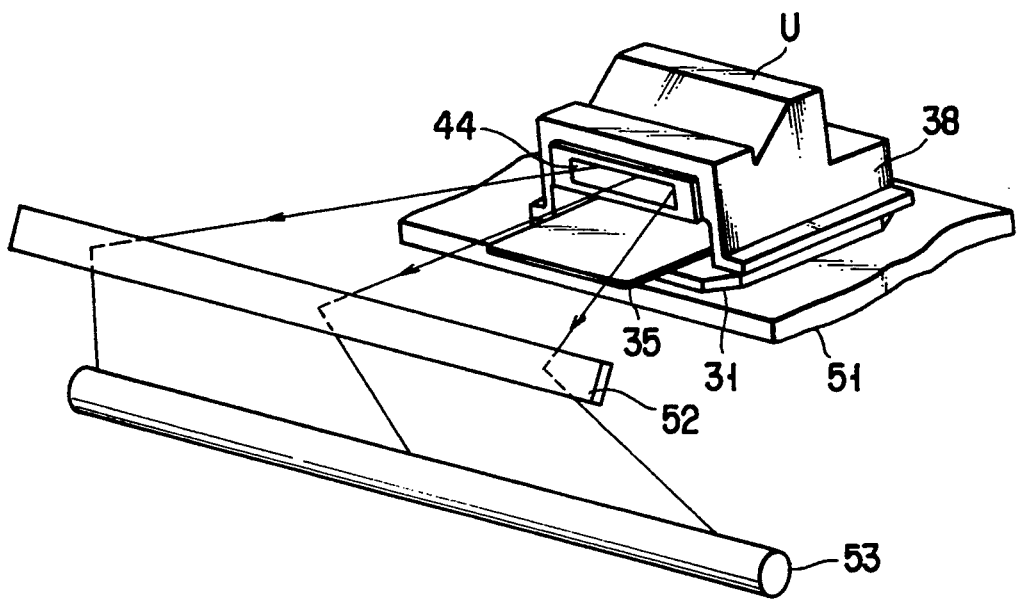
F I G. 5

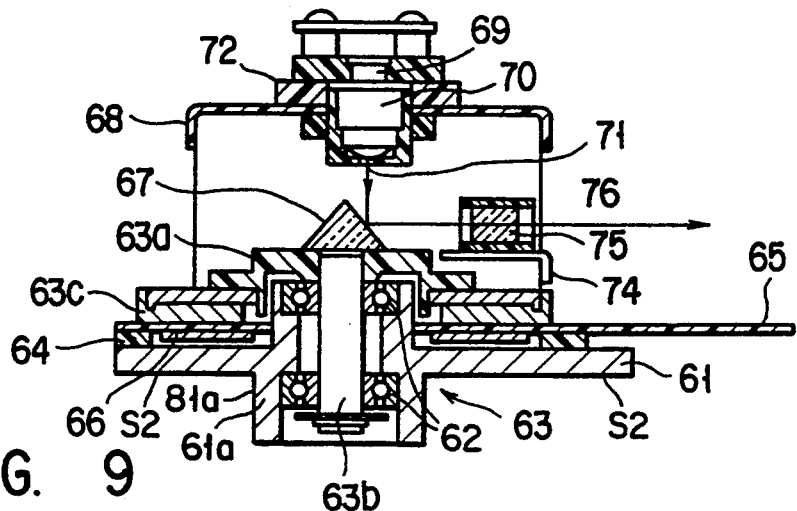
FIG. 9
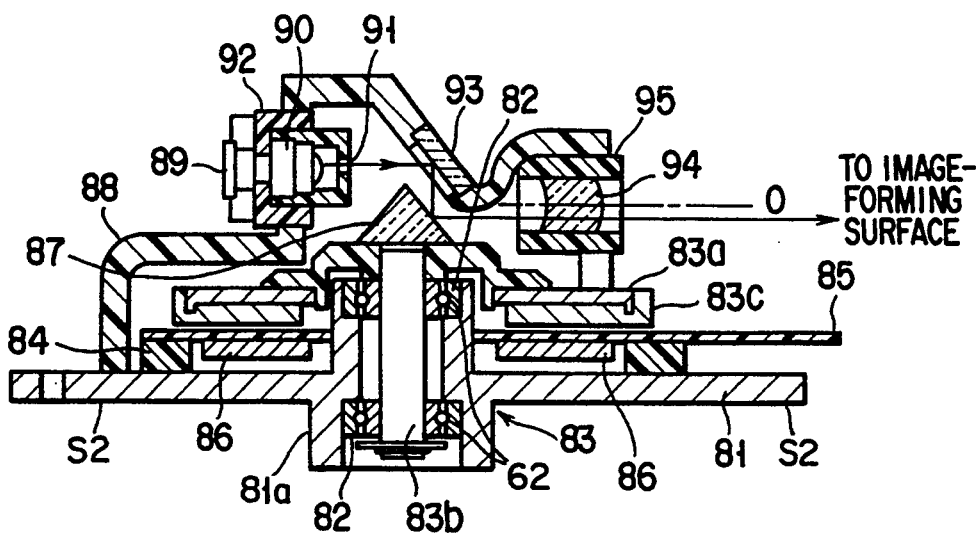
FIG. 10
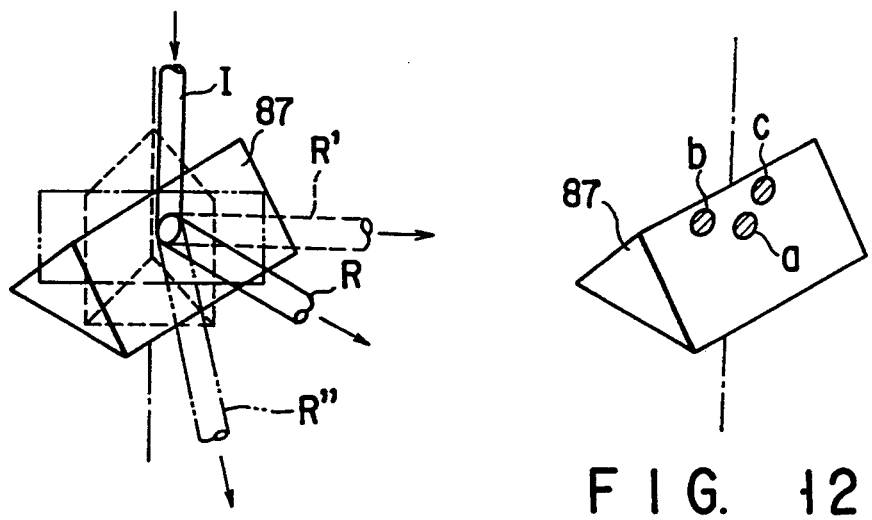
FIG. 11
FIG. 12

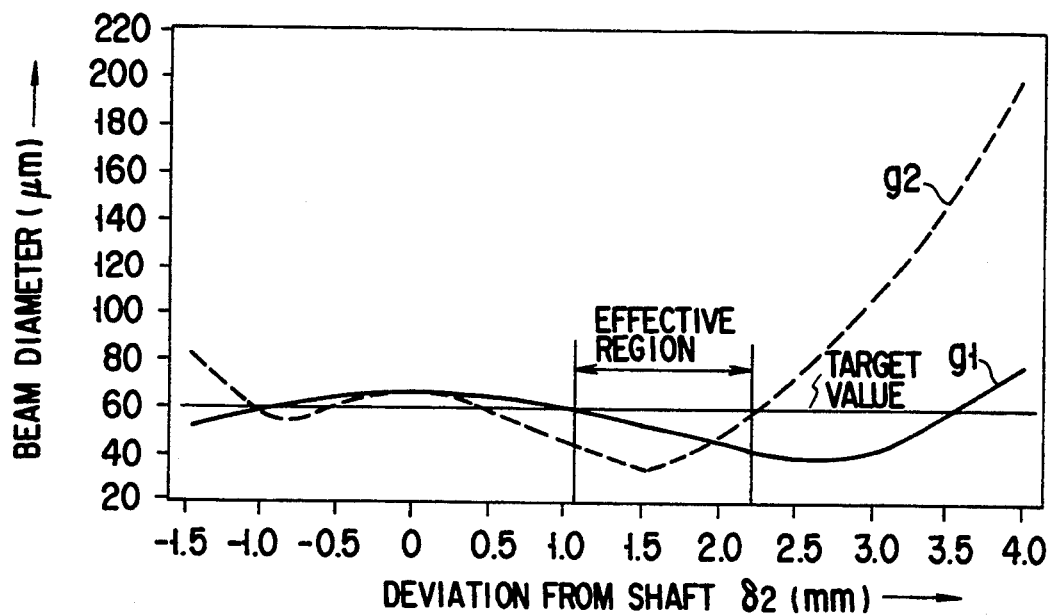
F I G. 16
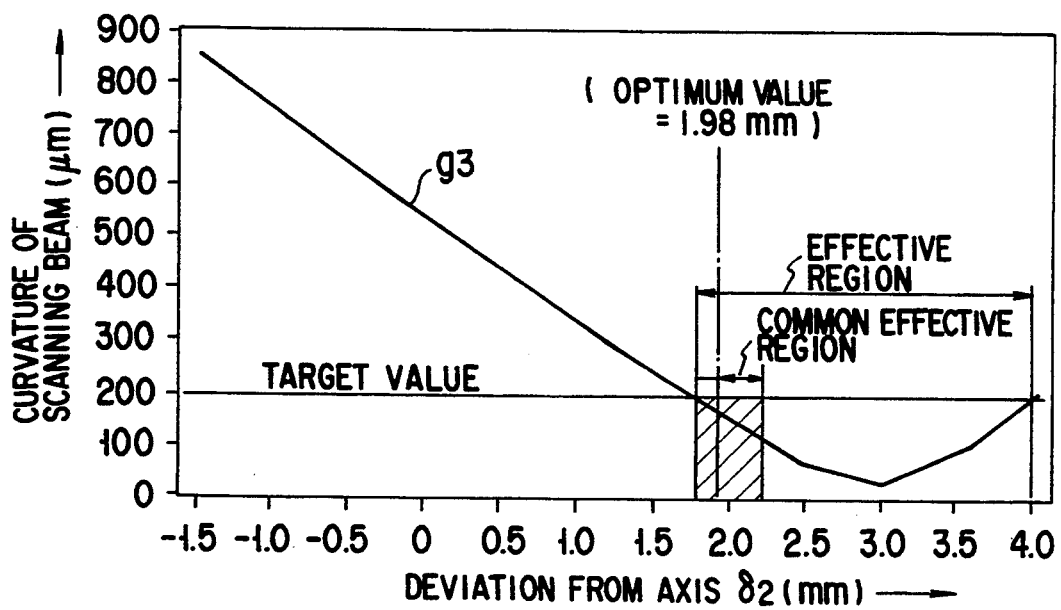
F I G. 17

OPTICAL SCANNING DEVICE FOR SCANNING LASER BEAM FOCUSED ON IMAGE-FORMING SURFACE

BACKGROUND OF THE INVENTION

1. Field of the Invention

The present invention relates to an optical scanning unit for forming an image on an image-forming surface by scanning a laser beam, which is applicable to a laser printer, laser facsimile, digital copy machine, and the like.

2. Description of the Related Art

A laser printer operating on a semiconductor laser device, has a photosensitive drum. Around the photosensitive drum, arranged are a charging device, an exposing device, a developing device, a transferring device, and the like, and a recording sheet feeding device and a fixing device are arranged respectively on the upstream and downstream sides of the photosensitive drum.

The exposing device includes an optical scanning unit consisting of a semiconductor laser device, an optical system, and a lens.

In a laser printer of this type, the semiconductor laser device is operated based on recording data, and a laser beam containing the recording data is emitted from the semiconductor laser device.

A laser beam emitted from the semiconductor laser device is deflected and scanned by the optical system, i.e., polygon mirror or the like, and then converged by the lens on the image-forming surface of the photosensitive drum.

At this point, the surface of the photosensitive drum is already uniformly charged by the charging device.

The surface is then exposed by the laser beam, and the recording data is recorded on the surface as a static latent image.

After that, the static latent image is developed by toner in the developing device, so as to be converted into a toner image.

The toner image is transferred in the transferring device on a recording sheet supplied from the feeding device.

The toner image transferred on the recording sheet is fixed thereon by the fixing device, thus completing a series of a printing operation.

An optical scanning unit is used in the exposure device of the laser printer. The optical scanning unit includes an optical system such as a polygon mirror, and as the polygon mirror is rotated, a laser beam emitted from the semiconductor laser device is deflected and scanned.

An example of the optical scanning unit is a pre-object type optical scanning unit in which an f$\theta$ lens is used.

FIG. 18 shows a structure of a pre-object type optical scanning unit.

As can be seen in FIG. 18, a laser beam emitted from a semiconductor laser device 1 is converted into a parallel beam by means of a collimator lens 2.

The parallel beam reflects on a rotating reflection mirror of a polygon mirror 3, which is rotated by a motor, so as to be converted into a scanning beam.

The scanning beam, after passing through a f$\theta$ lens 4, reflects on a reflection mirror 5, and further passes through a cylindrical lens 6 to be converged on the surface of a photosensitive drum 7.

An example of an optical scanning unit of the type in which no polygon is used is disclosed in U.S. Pat. No. 4,943,128 (by Takada).

FIGS. 20 and 21 shows a structure of a deflector, and as is shown, a unigon mirror 12 is mounted on the rotational axis of a motor 11.

The unigon mirror 12 is surrounded by a cylindrical slit member 13, in which a slit 14 is provided on the bottom portion thereof, and a slit 15 is provided at the position opposite to the reflection surface of the unigon mirror 12 of the periphery surface.

FIG. 19 shows a structure of an optical scanning device, and as is shown, a laser beam output from a laser unit 16 is made incident on the slit 14, and reflects on the reflection surface of the unigon mirror 12. The reflection beam from the unigon mirror 12 is output through the slit 15 as a scanning beam.

The scanning beam emitted from the slit 15 passes through the f$\theta$ lens 17, and reflects on a reflection mirror 18. Further, the beam is irradiated on a photosensitive drum 20 through a toroidal lens 19.

After passing through the f$\theta$ lens 17, a portion of the scanning beam is made incident on a photosensor 22 via an optical fiber 21, and thus a recording start position on the photosensitive drum 20 is determined.

It should be noted that a polygon mirror manufactured by a method in which an aluminum reflection film is provided on a glass polished material is very expensive.

Further, the production cost of a polygon mirror can be reduced to some extent by the method in which an aluminum material is machined by a diamond cutting bite; however a cutting machine must be prepared, and the required accuracy is extremely high. Consequently, a sufficient reduction in cost cannot be expected.

Moreover, there are a plurality of reflection surfaces in a polygon mirror, creating the problem of irregular deflecting surfaces due to a machining error of each deflection surface.

In order to correct the arrangement gap, another optical system for correction must be provided, and in an optical scanning unit shown in FIG. 18, an f$\theta$ lens 4 or a cylindrical lens 6 is used for correction. Further, the reflection mirror 5 and the cylindrical lens 6 are arranged close to the photosensitive drum 7, complicating the structure and increasing the size.

With regard to an optical scanning unit in which no polygon mirror is used, such as shown in FIGS. 19–21, there is only one reflection surface, and therefore the device is free from the drawbacks, i.e. the requirement for machining accuracy and the displacement. However, an f$\theta$ lens 17 and a toroidal lens 19 must be provided.

Further, since the reflection mirror 18 and the toroidal lens 19 are arranged close to the photosensitive drum 20, complicating the structure and increasing the size, as in the case shown in FIG. 18.

SUMMARY OF THE INVENTION

A purpose of the present invention is to provide an optical scanning unit having a simple structure and a small size.

Another purpose of the invention is to provide an optical scanning unit which can perform an accurate deflection and scanning with respect to an image-forming surface.

Another purpose of the invention is to provide an optical scanning unit which can be easily assembled.

According to the present invention, there is provided an optical scanning unit comprising: laser beam emitting means for emitting a laser beam; reflection means for reflecting the laser beam from the laser beam emitting means for deflection and scanning while the means being rotated; rotation driving means for controlling rotation of the reflection means; meniscus lens means, located close to the reflection means, for converging a laser beam from a reflection surface of the reflection means on an image-forming surface; and a housing in which the laser beam emitting, the reflection means, the rotation driving means, and the meniscus lens means are integrally assembled, said meniscus lens means having an incident surface, a curvature radius of which is set smaller than that of an output surface thereof, with a convex surface thereof facing the image-forming surface.

Further, in the meniscus lens means of the optical scanning unit of the invention, the optical axis center of a laser beam from the reflection surface of the reflection means is displaced from the center of the lens. In other words, the meniscus lens means is placed in the case such that a laser beam is made incident on the lens in an opposite direction to the convex direction of a curve traced by scanning of a laser beam deflected and scanned, being displaced by a predetermined distance.

According to the present invention, there is also provided an optical scanning unit comprising: laser beam emitting means for emitting a laser beam; reflection means for reflecting the laser beam from the laser beam emitting means for deflection and scanning while the means being rotated; rotation driving means for controlling rotation of the reflection means; bearing means for rotatably supporting a rotational axis of the rotation driving means; converging lens means, located close to the reflection means, for converging a laser beam from a reflection surface of the reflection means on the image-forming device; and a surrounding means for fixing the laser beam emitting means and the converging lens, and surrounding the reflection means, and the rotation driving means; and base means on which the bearing means is fixed, said base means having a reference position determining portion for mounting the surrounding means, and a reference surface for mounting the base means on an outside of the device.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a front view of the first embodiment with the case, viewed from the direction indicated by arrow B in FIG. 1;

FIG. 4 is a rear elevation of the first embodiment with the case, viewed from the direction indicated by arrow C in FIG. 1;

FIG. 5 is a perspective view of a part of the device in which the optical scanning unit shown in FIG. 1 is mounted;

FIG. 9 is a cross section showing the second embodiment of the present invention;

FIG. 10 is a cross section showing the third embodiment of the present invention;

FIG. 11 is a diagram showing the relationship between an incident laser beam and a reflection beam while a reflector rotating;

FIG. 12 is a diagram designed for describing a displacement of an incident laser beam by the rotation of a reflector;

FIG. 16 is a graph showing the relationship between the diameter of a beam on an image-forming surface and a degree $\delta_2$ of deviation of the axis with respect to the meniscus lens, in the case of sample 1 in the third example;

FIG. 17 is a graph showing the relationship between a degree $\delta_3$ of curvature of a scanning beam on an image-forming surface and a degree $\delta_2$ of deviation of the axis with respect to the meniscus lens, in the case of sample 1 in the third example;

DETAILED DESCRIPTION OF THE PREFERRED EMBODIMENTS (The First Embodiment)

Figure 1:
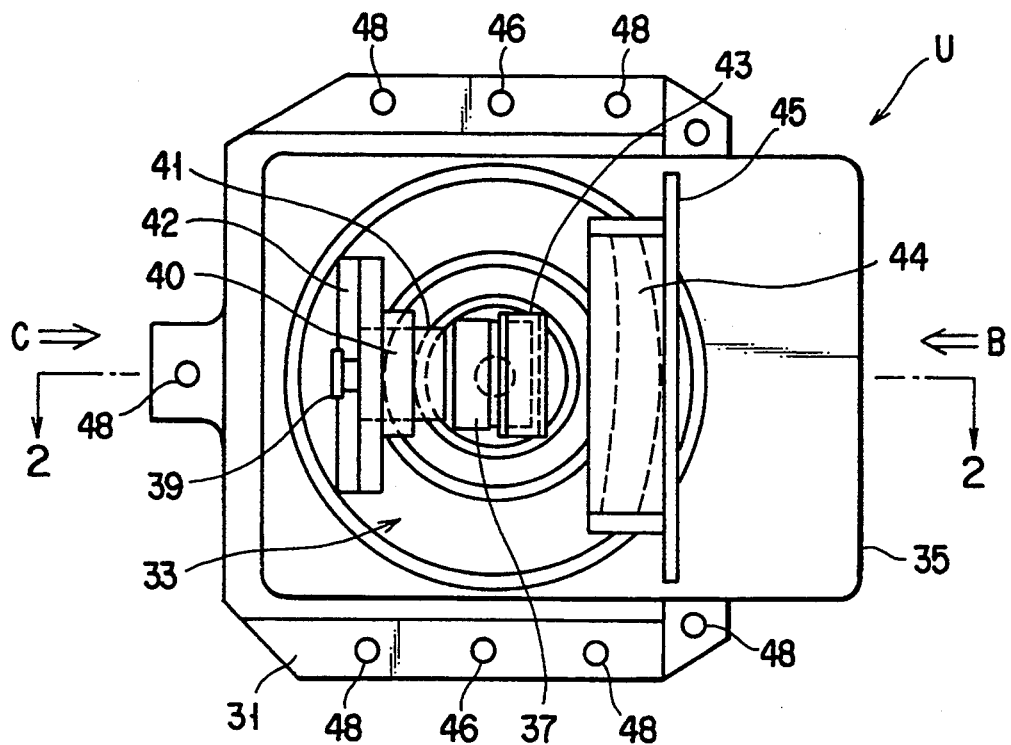
FIG. 1 is a plan view showing the first embodiment of the present invention without the case.
Figure 2:
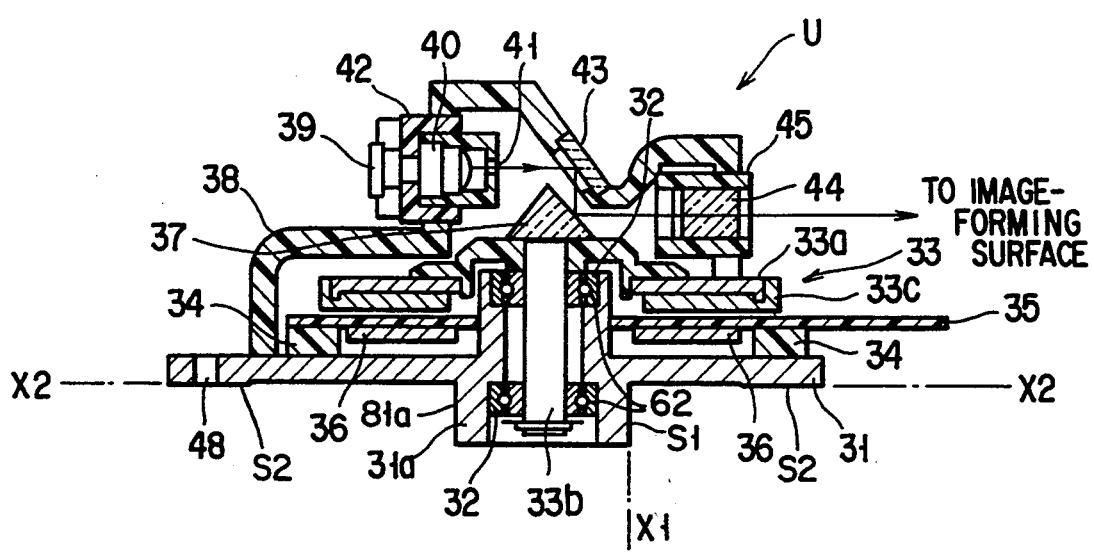
FIG. 2 is a cross section of the first embodiment with the case taken along the line 2—2 in FIG. 1.

FIGS. 1 and 2 show a structure of an optical scanning unit U.

A housing 31 has a substantially square shape, with a cylindrical portion 31a formed at the center. In the cylindrical portion 31a, a ball bearing 32 is provided.

A stater member of a scanner motor 33 is made of the housing 31.

A rotational axis 33b of a rotor 33a of the scanner motor 33 is rotatably supported by the bearing 32.

A magnet 33c is integrally mounted on the rotor 33a of the scanner motor 33.

A circuit substrate 35 is fixed to the housing 31 via a spacer 34.

A coil 36 is set on the circuit substrate 35 on the rear surface side of a section facing the magnet 33c.

A beam deflection element, for example, a right-angle-prism-shaped reflector 37, is fixed on the rotor 33a of the scanner motor 33 at a position above the rotational axis 33b.

The reflector 37 has two reflection surfaces crossing at right angle.

One remaining surface of the reflector 37 is fixed on the rotor 33a, with the center of the surface set to the rotational axis 33b of the scanner motor 33.

On the periphery of the upper surface of the housing 31, a box 38 is mounted such as to surround the scanner motor 33 and the reflector 37.

On the back portion of the box 38, detachably fixed by screws is a beam emitting unit 42 in which a semiconductor laser generator 39, a converging lens 40 and a circle aperture 41 are integrally housed, as shown in FIG. 4.

In the box 38, there is provided a slope surface at a position facing the beam-emitting section of the beam emitting unit 42, and a reflection mirror 43 is embedded in the slope surface.

The laser beam emitted from the beam emitting unit 42 is reflected on the reflection mirror 43, and then made incident on the reflection surface of the reflector 37 right from above.

To the front portion of the box 38, a case 45 with which a meniscus lens 44 is integrated by a resin mold, is detachably fixed by screws as shown in FIG. 3.

The meniscus lens 44 has an incident surface and output surface having a curvature radius smaller than that of the incident surface, and is fixed such that the convex side thereof faces toward the outside of the box 38, that is, the image-forming surface.

The reflector 37 deflects and scans light in a plane direction perpendicular to the axial direction of a rotational axis 33b of the scanner motor 33 which reflects a laser beam made incident on its reflection surface.

A deflected light from the reflector 37 is directed onto the image-forming surface of the meniscus lens 44, that is, a photosensitive surface of the photosensitive, drum described later, to form an image thereon.

In the beam scanning unit U, a bottom periphery surface S1 of a cylinder portion 31a of the housing 31 is set to be a reference surface X1 in the plane direction, and the unit is mounted onto, for example, the exposure device such that the reference surface X1 serves as a reference in the plane direction.

Further, in the unit U, the lower most surface S2 of a plate portion of the housing 31 is set to be a reference surface X2 in the height direction, and the unit is mounted onto, for example, the exposure device such that the reference surface X2 serves as a reference in the height direction.

In the housing 31, there are provided reference pins 46 for positioning the box 38 to be mounted on the housing.

In order to mount the box 38 to the housing 31, the reference pins 46 are engaged with holes made in the box 38.

The beam scanning unit U is fixed in the exposure device by means of screws put through screw holes 48 made in the periphery of the housing 31, for tightening the unit on the device.

As shown in FIG. 5, the beam scanning unit U is fixed to the main body 51 of an exposure device of, for example, a laser printer. A deflection beam which passed through the meniscus lens 44 of the beam scanning device U reflects on a turn mirror 52, and converged on the photosensitive surface of the photosensitive drum 53.

In the beam scanning unit U, a laser beam output from the semiconductor laser generator 39 is converted by means of a convergent lens 40 into a light beam which somewhat diverges, and then shaped into a circular laser beam through the circle aperture 41.

The laser beam changes its light path at right angle when reflected on the reflection mirror 43, and is made incident on the reflection surface of the reflector 37 arranged on the rotor 33a.

The laser beam is made incident on the reflection surface of the reflector 37 such that the beam proceeds in parallel with the rotational axis 35b and a few millimeters away from the center of the rotational axis 33b.

The rotation of the reflector 37 is controlled by the scanner motor 33.

An incident laser beam reflects on the reflection surface of the reflector 37, and is converted by the rotating reflector 37, into a deflection light for scanning in the plane direction perpendicular to the rotational axis 33b by a predetermined width.

The deflection light passes through the meniscus lens 44, and is output to the turn mirror 52.

The advantages of the embodiment will now be described.

In the beam scanning unit U, the scanner motor 33 is located on the housing 31, and the reflector 37 is fixed on the rotor 33a of the scanner motor 33. Further, the box 38 is mounted on the housing 31, to which fixed is the case 45 having the light-emitting unit 42 in which the semiconductor laser generator 39 is mounted, the reflection mirror 43 and the meniscus lens 44.

With the above-described structure, the members can be arranged without leaving a dead space therebetween, and therefore the device can be made small and compact.

The light-emitting unit 42 and the case 45 are fixed to the outer surface of the box 38 by means of screws.

Thus, these members can be easily fixed to the box, and the direction of a laser beam can be easily adjusted.

When the box 38 is set on the housing 31, the holes made in the box 38 are engaged with the reference pins 46 provided on the housing 31 for positioning.

Therefore, the position of each of the light-emitting unit 42, the reflection mirror 43, the meniscus lens 44, and the reflector 37 can be easily adjusted.

The beam scanning unit U is made into a unit, and therefore the scanning unit U can be easily set to the main body 51 of the exposure device.

There are less number of parts set in the exposure device, simplifying assembly of the device.

The beam scanning unit U has two reference surfaces X1 and X2 used when the unit is set to the main body of the exposure device 51.

With the two reference surfaces, the beam scanning unit U can be positioned with respect to the exposure device 51, and thus, the positioning can be simplified.

When the beam scanning unit U is set in the main body 51 of the exposure device, the projection formed in the lower portion of the cylinder 31a of the housing 31 is engaged in the mounting surface of the main body 51 of the exposure device 51.

With the structure, the height of the portion of the optical scanning device U projecting upward from the mounting surface can be reduced, thereby decreasing the height of the main body of the exposure device.

the deflection angle made by the reflector 37 is represented by $\theta$ (deg).

A laser beam output from the semiconductor laser generator 39 is converted by the convergent lens 40 into a light beam which somewhat diverges, and then made incident on the meniscus lens 44. As shown in FIG. 5, the distance between the deflection point and the apparent light-emitting point P in the case where there is no convergent lens 40 is represented by $L_{cnv}$ (mm).

Table 1 lists 25 types of samples No. 1 through No. 25.

In this table, samples No. 1 through No. 16 are meniscus lenses made of glass (BK7; n, $\lambda=780$ nm, 1.51143), whereas samples No. 17 through No. 25 are meniscus lenses made of acrylic resin (n, $\lambda=780$ nm, 1.48601).

TABLE 1

|   | Distance a(mm) | Curvature radius $r_{in}$(mm) | Curvature radius $r_{out}$(mm) | Lens thickness t(mm) | Deflection angle $\theta$(deg) | Length of light path L(mm) | Covergent distance $L_{cnv}$(mm) |
|---|---|---|---|---|---|---|---|
| 1 | 15.906 | −77.513 | −31.568 | 5 | 70 | 211.856 | −189.840 |
| 2 | 15.906 | −77.5 | −31.5 | 5 | 70 | 212.052 | −189.840 |
| 3 | 16.504 | −79.907 | −33.171 | 6 | 70 | 212.857 | −217.652 |
| 4 | 16.363 | −80.412 | −33.163 | 7 | 70 | 216.089 | −203.659 |
| 5 | 16.090 | −82.045 | −33.591 | 8 | 70 | 218.230 | −207.797 |
| 6 | 15.875 | −81.171 | −33.591 | 9 | 70 | 220.692 | −205.948 |
| 7 | 15.218 | −80.991 | −33.629 | 10 | 70 | 222.417 | −203.207 |
| 8 | 14.702 | −72.269 | −30.339 | 5 | 72 | 203.626 | −190.241 |
| 9 | 13.817 | −71.401 | −30.335 | 6 | 72 | 204.762 | −189.937 |
| 10 | 12.460 | −68.003 | −27.692 | 6 | 80 | 184.360 | −164.330 |
| 11 | 13.927 | −67.896 | −25.990 | 6 | 90 | 168.489 | −146.996 |
| 12 | 12.157 | −67.034 | −25.619 | 6 | 90 | 165.414 | −144.624 |
| 13 | 12.005 | −67.031 | −25.775 | 6 | 90 | 168.093 | −143.371 |
| 14 | 12.005 | −67.0 | −25.75 | 6 | 90 | 168.093 | −143.371 |
| 15 | 12.005 | −67.011 | −25.775 | 6. | 90 | 168.000 | −143.371 |
| 16 | 12.082 | −63.474 | −23.561 | 6 | 100 | 150.430 | −129.465 |
| 17 | 22.305 | −85.161 | −33.256 | 5 | 70 | 221.930 | −191.680 |
| 18 | 18.939 | −78.891 | −30.997 | 5 | 70 | 214.547 | −192.987 |
| 19 | 18.933 | −78.670 | −30.933 | 5 | 70 | 214.451 | −193.303 |
| 20 | 19.642 | −83.251 | −31.459 | 5 | 70 | 217.784 | −185.455 |
| 21 | 19.670 | −79.067 | −31.093 | 5 | 70 | 217.055 | −192.762 |
| 22 | 17.379 | −83.910 | −31.491 | 5 | 70 | 213.491 | −187.774 |
| 23 | 14.304 | −77.726 | −26.341 | 7 | 90 | 171.349 | −170.911 |
| 24 | 14.215 | −76.803 | −26.437 | 7 | 90 | 170.736 | −164.228 |
| 25 | 14.164 | −76.545 | −26.377 | 7 | 90 | 170.734 | −163.396 |

Consequently, the device can be made compact.

In the beam scanning unit U, the laser incident position located close to the rotation center of the scanner motor 33 serves also as the center of the scanning width of the laser beam.

Further, the rotation center of the scanner motor 33 serving as a reference of the optical measurement in the optical axial direction also serves as a reference for mounting the whole device.

Consequently, error factors can be removed from the assembly step, and an accurate positioning can be performed.

Figure 6:
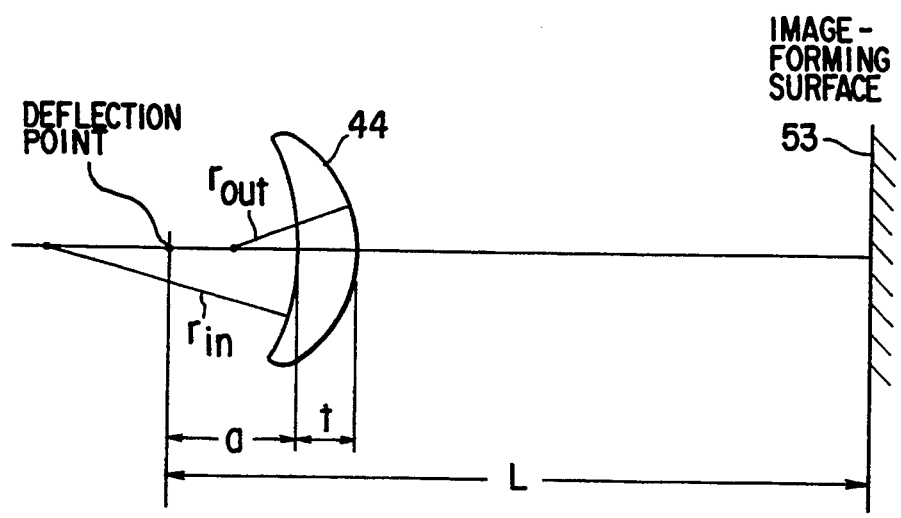
FIG. 6 is a diagram showing the relationship between the curvature radius of a meniscus lens, a deflection point, and an image-forming surface.
Figure 7:
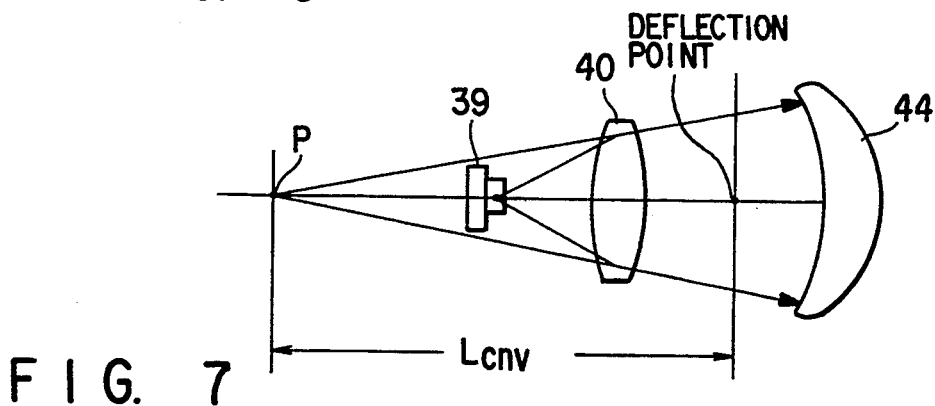
FIG. 7 is a diagram showing the relationship between a meniscus lens, a deflection point, and an apparent light-emitting point.

FIG. 6 is a diagram showing the relationship between a curvature radius of the meniscus lens 44, a deflection point (also reflection point) of the reflector 37, and an image-forming surface of the photosensitive drum 53.

In FIG. 6, the curvature radius of the incident surface of the meniscus lens 44 is represented by $r_{in}$ (mm), the curvature radius of the output surface is represented by $r_{out}$ (mm), and the distance from the deflection point (reflection point of the reflector 37) to the incident surface of the meniscus lens 44 is represented by a (mm), the thickness of the meniscus lens 44 is represented by t (mm), the distance from the deflection point to the image-forming surface (photosensitive surface of the photosensitive drum 53) is represented by L (mm), and As is clear from this table, for a deflection angle $\theta$ of 70–100 (deg), the larger the value of $\theta$, the smaller the value of each of the distance a, the curvature radius of the incident surface $r_{in}$, and the curvature radius $r_{out}$ of the output surface.

With a meniscus lens made of glass and having a deflection angle of 70 deg, as the thickness t is varied from 5 to 10 mm, the results of the samples No. 1 to No. 7 were obtained.

More specifically, When each value is set as follows a=15 to 17 mm, $r_{in}=-77$ to $-83$ mm, $r_{out}=-31$ to $-34$ mm, L=211 to 223 mm, $L_{cnv}=-189$ to $-218$, the size of the whole device can be reduced in accordance with the diameter of the scanner motor 33.

Consequently, the whole structure of the beam scanning unit U can be made sufficiently small.

Further, with the beam scanning unit U, there is no need to provide various types of lenses between the meniscus lens 44 and the image-forming surface, lessening variation of the beam diameter of the laser beam on the image-forming surface.

Consequently, the beam scanning unit U can contribute to reduction of the size of the whole device, and stabilization of the laser beam on the image-forming surface.

By use of sample No. 2, and a beam having a diameter (cross section) of φ2 mm, a simulation was conducted.

The spot diameters at various deflection angles were as follows:

12.0265 μm (in main scanning direction)×12.0265 μm (in sub-scanning direction) at a deflection angle of 0;
9.98563 μm×10.5819 μm at a deflection angle of 5;
6.06588 μm×6.6858 μm at a deflection angle of 10;
18.9335 μm×15.0884 μm at a deflection angle of 20;
28.8501 μm×25.7444 μm at a deflection angle of 25;
33.4721 μm×35.5764 μm at a deflection angle of 30;
and 27.6386 μm×42.6738 μm at a deflection angle of 35.

It should be noted that the simulation value indicates a geometric convergent state.

Figure 8:
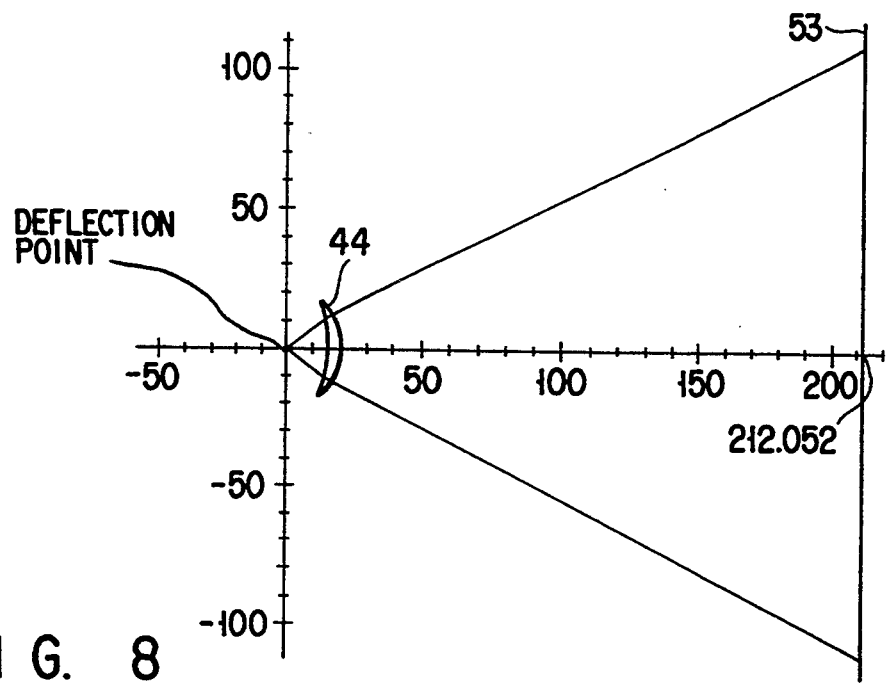
FIG. 8 is a diagram showing an example of a simulation state.

FIG. 8 is a diagram showing a simulation state of sample No. 20.

With the optical scanning device, the variation of the beam diameter was reduced mainly by correcting the curvature of the image surface, and therefore the $f\theta$ characteristic is slightly deteriorated.

As a result, it is necessary to correct $f\theta$ in the optical scanning device, and correction of $f\theta$ is electrically carried out.

It was concluded from samples No. 1 to No. 25 that the whole device can be made sufficiently small when $a = 12$–$23$ mm, $r_{in} = -63$ to $-86$ mm, $r_{out} = -23$ to $-34$ mm, $\theta = 70$ to $100$ deg, $L = 150$ to $223$ mm, and $L_{cnv} = -129$ to $-218$ mm.

The optical scanning device has a structure in which a reflector 37 is fixed on the rotational axis 33b of the scanner motor 33, and a case 45 in which a beam emitting unit 42, a reflection mirror 43, and a meniscus lens 44 are housed is set to a certain position of the box 38.

Since no other lens or reflection mirrors are not used, the structure is simple.

In the above-mentioned embodiment, two surfaces of the reflector 37 crossing at right angle serve as reflection surfaces, but the invention is not limited to the structure. For example, the rest of the surface of the reflector 37 (that fixed to the rotor 33a in the embodiment) may be used singly as a reflection surface. In this case, the center of the reflection surface is aligned with the center of the rotational axis, a laser beam is made incident along the center of the rotational axis.

The reflector is not limited to a right-angle-prism-shaped reflector, but may be an isosceles-prism-shaped reflector and a reflection mirror.

(The Second Embodiment)

As shown in FIG. 9, a housing 61 has a substantially rectangular shape, at a center of which a cylindrical portion 61a is formed. In the cylindrical portion 61a, there is provided a bearing 62 in the form of a ball bearing.

The stator member of the scanner motor 63 is a part of the housing 61.

The rotational axis 63b of the rotor 63a of the scanner motor 63 is rotatably supported by the bearing 62.

The rotor 63a of the scanner motor 63 is formed integrally with the magnet 63c. A circuit substrate 65 is fixed to the housing 61 via a spacer 64. A coil 66 is mounted on the rear surface side of the portion facing the magnet 63c.

On the rotor 63a of the scanner motor 63, there is provided a right-angle-prism-shaped reflector 67 at a position above the rotational axis 63b.

The reflector 67 has two reflection surfaces crossing at right angle.

The rest of the surface of the reflector 67 is fixed to the rotor 63a such that the center of the surface is set on the rotational axis 63b of the scanner motor 63.

At the periphery of the upper surface of the housing 61, a box 68 is set such as to surround the scanner motor 63 and the reflector 67.

At the center of the upper surface of the box 68, a light emitting unit 72 is detachably fixed by screws, and in the unit, integrally formed are a semiconductor laser generator 69, a convergent lens 70 and a circle aperture 71.

A laser beam emitted from the beam emitting unit 72 is made incident directly on the reflection surface of the reflector 67 right from above.

A base 74 is fixed to the front surface of the box 68.

To the base 74, fixed is a case 76 with which a meniscus lens 75 is integrated by a resin mold.

The meniscus lens 75 has an incident surface and an output surface having a curvature radius smaller than that of the incident surface, and is fixed such that the convex side thereof faces toward the outside of the box 68, that is, the image-forming surface.

In this embodiment also, the output surface of the meniscus lens 75 has a curvature radius smaller than that of the incident surface, and is integrally formed in the box 68 such that the convex side thereof faces toward the image-forming surface.

With the structure described above, the whole structure of the optical scanning device can be made sufficiently small, as in the first embodiment.

Further, there is no need to provide various types of lenses between the meniscus lens 75 and the image-forming surface, and therefore a variation of the beam diameter on the image-forming surface can be made small.

Furthermore, in this embodiment, there is no need to provide a reflection mirror for reflecting a laser beam emitted from the beam emitting unit 72, thereby simplifying the structure.

(The Third Embodiment)

As shown in FIG. 10, a cylindrical portion 81a is formed in the center portion of a housing 81. In the cylindrical portion 81a, a ball bearing 82 is provided.

A stater member of a scanner motor 83 is made of the housing 81.

A rotational axis 83b of a rotor 83a of the scanner motor 83 is rotatably supported by the bearing 82.

A magnet 83c is integrally mounted on the rotor 83a of the scanner motor 83.

A circuit substrate 85 is fixed to the housing 81 via a spacer 84.

A coil 86 is set on the circuit substrate 85 on the rear surface side of a section facing the magnet 83c.

A right-angle-prism-shaped reflector 87 is fixed on the rotor 83a of the scanner motor 83 at a position above the rotational axis 83b.

The reflector 87 has two reflection surfaces crossing at right angle.

One remaining surface of the reflector 87 is fixed on the rotor 83a, with the center of the surface set to the rotational axis 83b of the scanner motor 83.

On the periphery of the upper surface of the housing 81, a box 88 is mounted such as to surround the scanner motor 83 and the reflector 87.

On the back portion of the box 88, detachably fixed by screws is a beam emitting unit 92 in which a semiconductor laser generator 89, a converging lens 90 and a circle aperture 91 are integrally housed.

In the box 88, there is provided a slope surface at a position facing the beam-emitting section of the beam emitting unit 92, and a reflection mirror 93 is embedded in the slope surface.

The laser beam emitted from the beam emitting unit 92 is reflected on the reflection mirror 93, and then made incident on the reflection surface of the reflector 87 right from above.

To the front portion of the box 88, fixed is a case 95 with which a meniscus lens 94 is integrated by a resin mold.

The meniscus lens 94 has an incident surface and an output surface having a curvature radius smaller than that of the incident surface, and is fixed such that the convex side thereof faces toward the image-forming surface.

A laser beam is reflected on the reflection surface of the reflector 87, and deflected for scanning in the plane direction crossing at right angle with the axial direction of the rotational axis 83b of the scanner motor 83.

The deflection beam from the reflector 87 is irradiated via the meniscus lens 94 on the image-forming surface to form an image thereon.

The case 95 is fixed to the box 88 such that the incident position of the case where the scanning angle of a deflection beam from the reflector 87 is 0° is located in an area slightly below the center O of the meniscus lens 94.

Therefore, the incident position of the deflection beam on the meniscus lens 94 in the case where the scanning angle of the deflection beam is 0°, is displaced from the center O in the opposite direction to the projecting direction of the curve of a scanning trace of a deflection beam from the reflector 87.

As shown in FIG. 11, in the embodiment, when a deflection beam is made incident on the center of the meniscus lens 94 from the reflector 87, the incident laser beam I is output in the direction of the reflection beam R.

In the case where the reflector 87 is located at the position indicated by the dot line in the figure, the incident laser beam I is output in the direction of a reflection beam R'.

In the case where the reflector 87 is located at the position indicated by the two-dot chain line in the figure, the incident laser beam I is output in the direction of a reflection beam R".

The position of the reflection surface of the reflector 87 at where an incident laser beam I is input, i.e., the position of the deflection point, is at where point a is located when the scanning angle of the deflection beam is 0° (indicated by the continuous line in FIG. 11) as shown in FIG. 12.

Further, when the scanning angle increases as the reflection surface rotates (as indicated by the dot line and the two-dot chain line in FIG. 11), the position of the deflection point will be at points b and c, raising the position of the deflection point.

Figure 13:
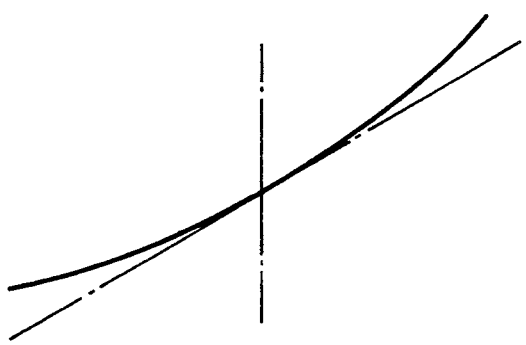
FIG. 13 is a diagram showing a scanning trace of a deflected beam made incident on a meniscus lens.

Consequently, the scanning trace of a deflection beam made incident on the meniscus lens 94 will be as shown in FIG. 13, and more specifically, a quadratic curve of a concave-down shape with respect to the position of the case of the scanning angle 0°.

The direction of the deflection beam is reversed by the meniscus lens 94.

Consequently, the scanning trace of the deflection beam reaching the photosensitive surface will be a concave-up quadratic curve.

Figure 14:
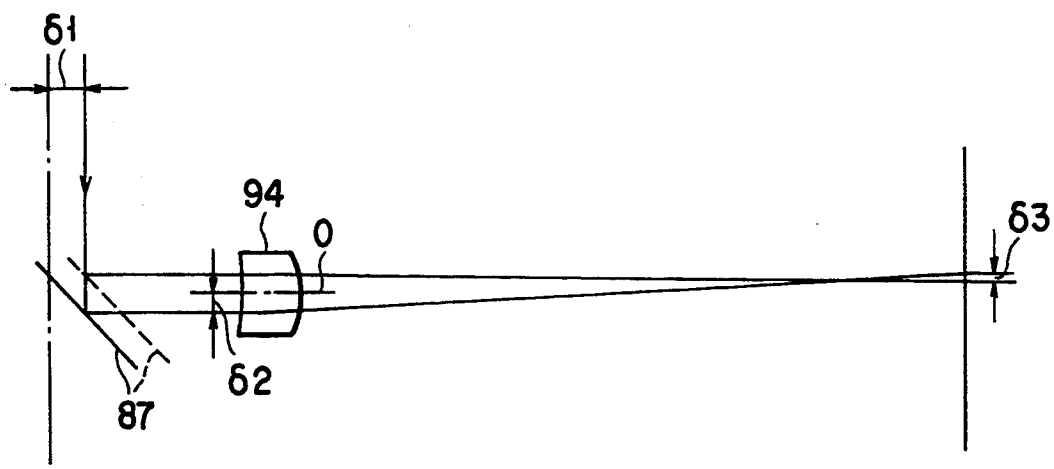
FIG. 14 is a diagram designed to describe the relationship between a change in scanning angle and a degree of a scanning curvature when the position of the meniscus lens where a deflection light is made incident when the scanning angle is 0°, is set to be lower than the center of the lens.

In the embodiment, the position of the meniscus lens 94 on which the deflection beam is made incident is set to be located below the center O in the case where the scanning angle is 0°, as shown in FIG. 14.

The deflection beam of the case where the scanning angle is 0° (the deflection point of the reflector 87 is located at point a in FIG. 12) is deflected upward when passing through the meniscus lens 94. When the scanning angle is large (the deflection point of the reflector 87 is located at points b and c), the deflection beam is deflected downward when passing through the meniscus lens 94. However, the amount of deflection is small.

Consequently, the scanning trace of the deflection beam reaching the image-forming surface (photosensitive surface) takes the form of a concave-up quadratic curve with a small amount of deflection.

Thus, scanning of an image-forming device can be conducted with a substantially straight laser beam, achieving a highly accurate deflection scanning operation.

Figure 15:
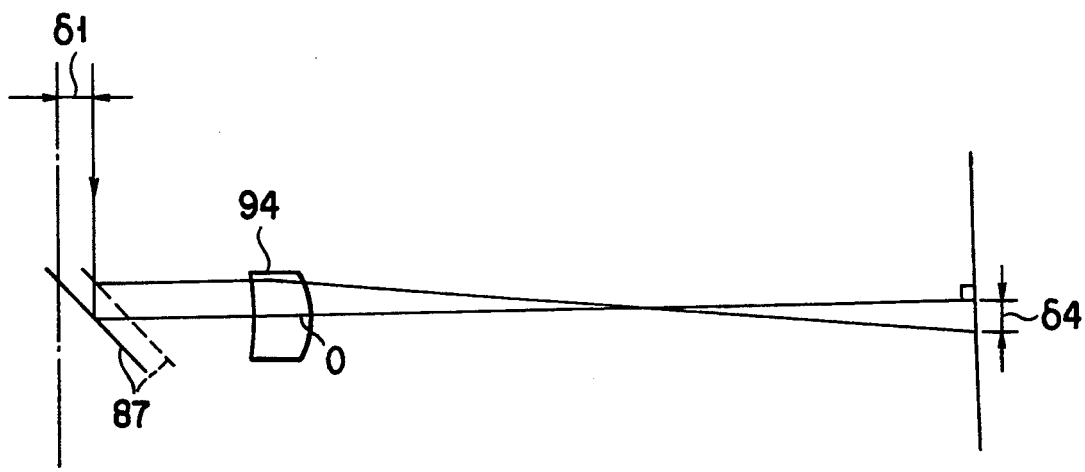
FIG. 15 is a diagram designed to describe the relationship between a change in scanning angle and a degree of a scanning curvature when the position of the meniscus lens where a deflection light is made incident when the scanning angle is 0°, is set at the center of the lens.
Figure 18:
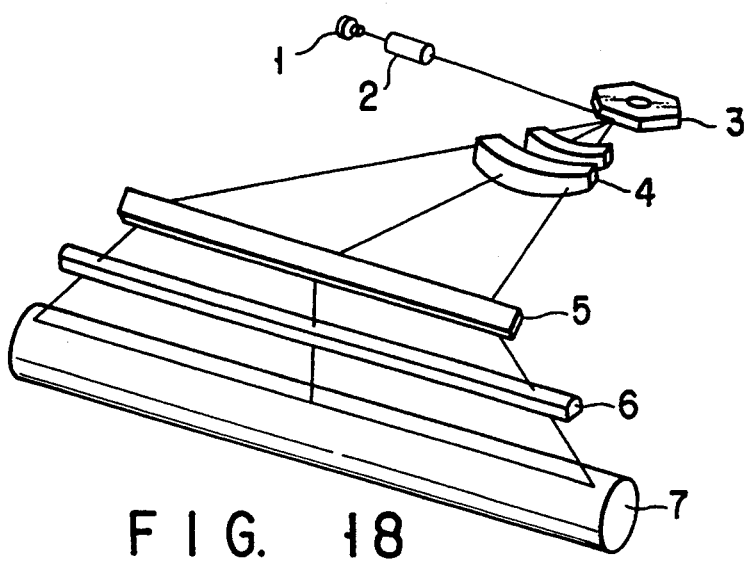
FIG. 18 is a perspective view of a conventional device.
Figure 19:
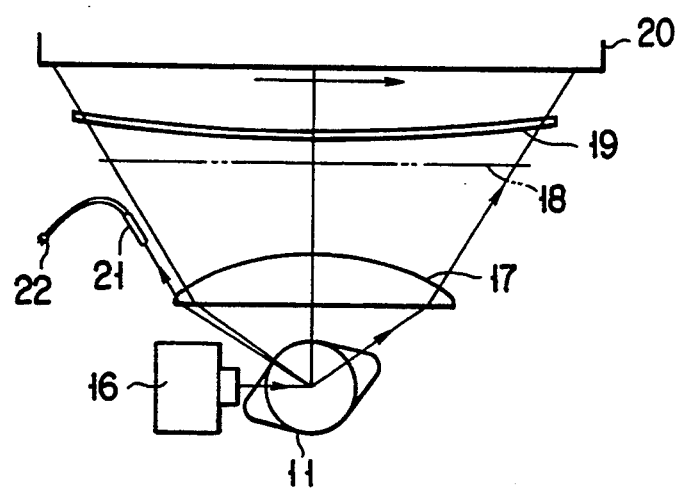
FIG. 19 is a perspective view of another conventional device.
Figure 20:
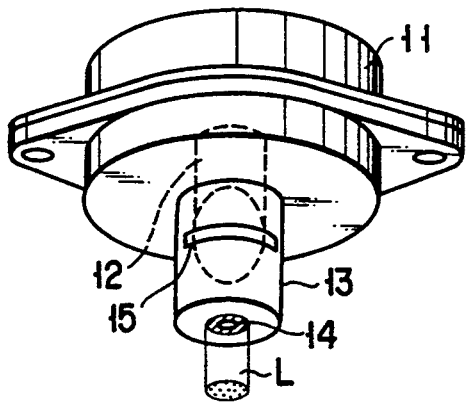
FIG. 20 is a perspective view showing a structure of a deflector of the conventional device shown in FIG. 19.
Figure 21:
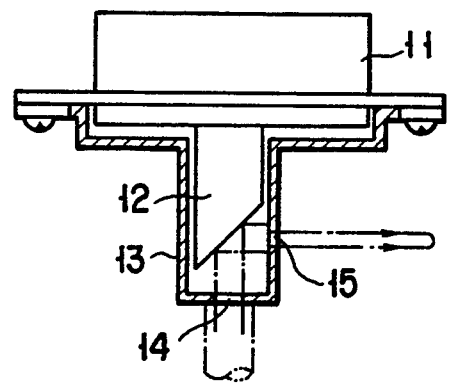
FIG. 21 is a cross section showing a structure of a deflector of the conventional device shown in FIG. 19.

If the position of the meniscus lens 94 where a deflection beam is made incident is set to coincide with the center O of the lens when the scanning angle is 0° as shown in FIG. 15, the deflection beam passes through the meniscus lens 94 without any deflection, in the case where the scanning angle is 0°.

When the scanning angle is large, the deflection beam is deflected greatly downward when passing through the meniscus lens 94.

Consequently, the scanning trace of the deflection beam reaching the image-forming surface (photosensitive surface) takes the form of a sharp concave-up quadratic curve, with a large amount of deflection.

In FIGS. 14 and 15, $\delta_1$ represents a deviation from axis, defined as a gap between the rotation center of the scanner motor 83 and a deflection point, $\delta_2$ represents a deviation from axis with regard to the meniscus lens 94, and each of $\delta_3$ and $\delta_4$ represents the curvature of a scanning beam.

A test was conducted under the following conditions: the deviation from axis $\delta$ set to 2 mm, the thickness of meniscus lens 94 set to 7 mm, the curvature radius of incident surface set to −77.5374 mm, the curvature radius of output surface of −28.4188 mm, the lens incident surface coordinates of the meniscus lens 94, and the maximum scanning angle 90°. According to the results, the curvature of scanning beam $\delta_3$ was 166,974 μm when the deviation from axis $\delta$ was set to be about 2 mm, whereas is the curvature $\delta_4$ was 547,432 μm when the deviation from axis $\delta_1$ was set to be 0 mm.

With the deviation from axis with regard to the meniscus lens 94 set to about 2 mm, the curvature of scanning beam was reduced to ⅓ or less as compared to the case where the deviation was set to 0 mm.

Here, the relationship between a deviation from axis $\delta_1$ and a deviation from axis $\delta_2$ with regard to the meniscus lens 94 was examined, and the results were indicated in Table 2, where the curvature radius of the incident surface of the meniscus lens 94 is represented by $r_{in}$ (mm), the curvature radius of the output surface is represented by $r_{out}$ (mm), and the distance from the deflection point (reflection point of the reflector 87) to the incident surface of the meniscus lens 94 is represented by a (mm), the thickness of the meniscus lens 44 is represented by t (mm), the distance from the deflection point to the image-forming surface (photosensitive surface of the photosensitive drum) is represented by L (mm), the deflection angle made by the reflector 87 is represented by $\theta$ (deg), and the distance between the apparent light emitting point P and the deflection point in the case where there is no convergent lens 90 present is $L_{cnv}$ (mm).

Thus, the deviation, $\delta_2$, from axis, for sample 1 is determined.

In a similar manner to the above, the values for samples 2–4 listed in Table 2 are determined.

With the deviation $\delta_2$ of the meniscus lens 94 set to the optimum value, the curvature, $\delta_3$, of scanning beam at an image-forming surface can be suppressed to a sufficient level. Further, the beam diameter can be made small.

TABLE 2

| | Distance a(mm) | Curvature radius $r_{in}$(mm) | Curvature radius $r_{out}$(mm) | Lens thickness t(mm) | Deflection angle $\theta$(deg) | Length of light path L(mm) | Covergent distance $L_{cny}$(mm) | Deviation from axis $\delta_1$(mm) | Deviation from axis with regard to meniscus lens $\delta_2$(mm) |
|---|---|---|---|---|---|---|---|---|---|
| 1 | 16.5547 | −77.537 | −28.419 | 7 | 90 | 171.392 | −166.248 | 2.0 | 1.980 |
| 2 | 15.2417 | −72.451 | −27.070 | 7 | 90 | 171.485 | −150.408 | 1.5 | 2.107 |
| 3 | 14.0881 | −68.083 | −25.930 | 7 | 90 | 171.529 | −139.05 | 1.0 | 2.164 |
| 4 | 18.846 | −82.718 | −31.233 | 7 | 90 | 194.598 | −183.500 | 2.0 | 1.891 |

With respect to, for example, sample 1 listed in Table 2, the relationship between a beam diameter of an image-forming surface and a deviation from axis $\delta_2$ with regard to the meniscus lens 94 was examined under the following conditions: the radius of curvature, $r_{in}$ (mm), of the incident surface of the meniscus lens 94 set to −77,537 mm, the radius of curvature, $r_{out}$ (mm), of the output surface set to −28.419 mm, the distance a (mm) from the deflection point to the incident surface of the meniscus lens 94 set to 16.5547 mm, the thickness t (mm) of the meniscus lens 44 set to 7 mm, the distance L (mm) from the deflection point to the image-forming surface set to 171.392 mm, the deflection angle made by the reflector 87 $\theta$ (deg) set to 90 degree, and the distance $L_{cnv}$ (mm) between the apparent light emitting point P and the deflection point in the case where there is no convergent lens 90 set to −166,248 mm, and the deviation from axis, $\delta_1$, set to 2.0 mm. The results were as shown in FIG. 16, with the continuous curve $g_1$ indicating the beam diameter of the main scanning direction, whereas the dot curve $g_2$ indicating that of the sub-scanning direction.

When the target value of the beam diameter of each of the main and sub-scanning directions is set to be 60 $\mu$m or less, the effective region will be located as indicated in the figure.

Further, the relationship between a curvature, $\delta_3$, of scanning beam and a deviation, $\delta_2$, from axis of the meniscus lens 94 at an image-forming surface, was examined, and the results were as indicated in FIG. 17 by a curve $g_3$.

As shown in this figure, when the target value for the curvature, $\delta_3$, of scanning beam is set to 200 $\mu$m or less, the effective region will be as indicated in the figure.

When the effective regions shown in FIGS. 16 and 17 are superimposed on each other, a common effective region will be as indicated in FIG. 17.

Consequently, when the deviation, $\delta_2$, from axis of the meniscus lens 94 is set within the range of the common effective region, the beam diameter of each of the main and sub-scanning directions on an image-forming device will be 60 $\mu$m or less, and the curvature, $\delta_3$, from axis will be 200 $\mu$m.

In consideration of the relationship between a beam diameter and a curvature, $\delta_3$, of scanning beam, the optimum deviation value ($\delta_2$) was calculated to be 1.980 mm.

with the structure described above, a highly accurate deflection and scanning operation can be performed on an image-forming surface.

In this embodiment, the size of the device can be reduced, and the stabilization of a beam on an image-forming surface can be achieved, thus obtaining advantages similar to those of the other embodiments.

In this embodiment, a right-angle-prism-shaped reflector was used as a reflector; however the present invention is not limited to the type described. For example, the reflector may be an isosceles-prism-shaped reflector, a reflection mirror, or the like.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An optical scanning unit for scanning a laser beam, and for converging the laser beam on an image-forming surface, comprising:

housing means;

laser beam emitting means for emitting a laser beam, said emitted laser beam being diverged at a diverging angle;

laser beam converging means for making said laser beam diverge at a smaller diverging angle than that of said laser beam emitted by said emitting means;

rotatable reflection means for reflecting the laser beam from said laser beam converging means for deflection and scanning while the reflection means is rotated;

rotation driving means for controlling rotation of said reflection means; and meniscus lens means, located close to said reflection means, for converging said laser beam received from a reflection surface of said reflection means onto said image-forming surface, said meniscus lens means having concave and convex surfaces, an absolute value of a radius of curvature of the concave surface being set smaller than an absolute value of a radius of curvature of the convex surface, said convex surface facing said image-forming surface;

wherein said laser beam emitting means, said laser beam converging means, said reflection means, said rotation driving means and said meniscus lens means are integrally built in said housing means.

2. An optical scanning unit according to claim 1, wherein:
   said laser beam emitting means includes a semiconductor laser generator and a converging lens; and
   said converging lens converts the laser beam from said semiconductor laser generator into a beam having a lesser degree of divergence than that of said laser beam from said semiconductor laser generator.

3. An optical scanning unit according to claim 1, wherein:
   said laser beam emitting means includes a semiconductor laser generator, a converging lens, and a circle aperture; and
   said converging lens converts the laser beam from said semiconductor laser generator into a beam having a lesser degree of divergence than that of said laser beam from said semiconductor laser generator.

4. An optical scanning unit according to claim 1, wherein said reflection means reflects the laser beam from the laser beam converging means on the reflection surface, and deflects the beam in a plane direction perpendicular to a rotational axis of the rotation driving means, for effecting scanning.

5. An optical scanning unit according to claim 1, wherein the laser beam converging means makes the laser beam from said laser beam emitting means incident on the reflection surface of the reflection means in parallel with a rotational axis of the rotation driving means.

6. An optical scanning unit according to claim 1, wherein the meniscus lens means is arranged in said housing means such that an axial center of a laser beam from the reflection surface of the rotatable reflection means is made incident on the meniscus lens means and is displaced by a predetermined distance in an opposite direction to a convex direction of a curve traced by scanning a laser beam which is deflected and scanned by said rotatable reflection means.

7. An optical scanning unit for scanning a laser beam, and for converging the laser beam on an image-forming surface, comprising:
   housing means;
   laser beam emitting means for emitting a laser beam, said emitted laser beam being diverged at a diverging angle;
   laser beam converging means for making said laser beam diverge at a smaller diverging angle than that of said laser beam emitted by said emitting means;
   rotatable reflection means for reflecting the laser beam from said laser beam converging means for deflection and scanning while the reflection means is rotated;
   rotation driving means for controlling rotation of said reflection means, said rotation driving means having a rotation shaft;
   bearing means for rotatable supporting said rotation shaft of said rotation driving means;
   converging lens means, located close to said reflection means, for converging a laser beam received from a reflection surface of said reflection means onto said image-forming surface;
   surrounding means for fixing said laser beam emitting means and said converging lens means relative to each other, and for surrounding said reflection means and said rotation driving means; and
   base means on which said bearing means is fixed, said base means having a reference position determining portion for mounting said surrounding means thereon, and said base means further having a reference surface for mounting the base means to said housing means.

* * * * *